United States Patent [19]
Brown et al.

[11] Patent Number: 6,095,507
[45] Date of Patent: Aug. 1, 2000

[54] PNEUMATIC CLAMP

[75] Inventors: Gerald A. Brown, Roseville; Jeffrey S. McNamara, Grosse Ile; Donald D. Pagels, Jr., Grosse Pointe Woods, all of Mich.

[73] Assignee: Unova IP Corp., Woodland Hills, Calif.

[21] Appl. No.: 09/235,693

[22] Filed: Jan. 22, 1999

[51] Int. Cl.[7] .................................................. B23Q 3/08
[52] U.S. Cl. ........................... 269/34; 269/232; 269/235; 72/401; 72/407; 72/452.7
[58] Field of Search ................ 269/32, 34, 229, 269/232, 235; 72/401, 407, 452.7

[56] References Cited

U.S. PATENT DOCUMENTS

| | | | |
|---|---|---|---|
| 3,737,157 | 6/1973 | Kiwalle | 269/34 |
| 5,787,754 | 8/1998 | Carrion et al. | 72/407 |
| 5,816,567 | 10/1998 | Horn | 269/34 |
| 5,941,513 | 8/1999 | Moilanen et al. | 269/32 |
| 5,954,320 | 8/1999 | Bohler | 269/34 |

*Primary Examiner*—Robert C. Watson
*Attorney, Agent, or Firm*—Reising, Ethington, Barnes, Kisselle, Learman & McCulloch, P.C.

[57] ABSTRACT

A clamp having a pneumatic cylinder with an actuating rod connected to one end of a drive arm which has its other end attached to a crankshaft which in turn has crankpins eccentrically mounted thereon to drive inner and outer clamp arms between retracted and advanced positions corresponding to open and closed positions of the clamp. The length of the drive arm, the extent to which the crankpins are offset from the crankshaft, the specific portion of a quadrant through which the crankpins are rotated, and the distance between the application of the force to the clamp arms and the axes about which the clamp arms pivot all provide a significant mechanical advantage and an extremely large clamping force from relatively low pressure compressed air supplied to the pneumatic cylinder.

24 Claims, 4 Drawing Sheets

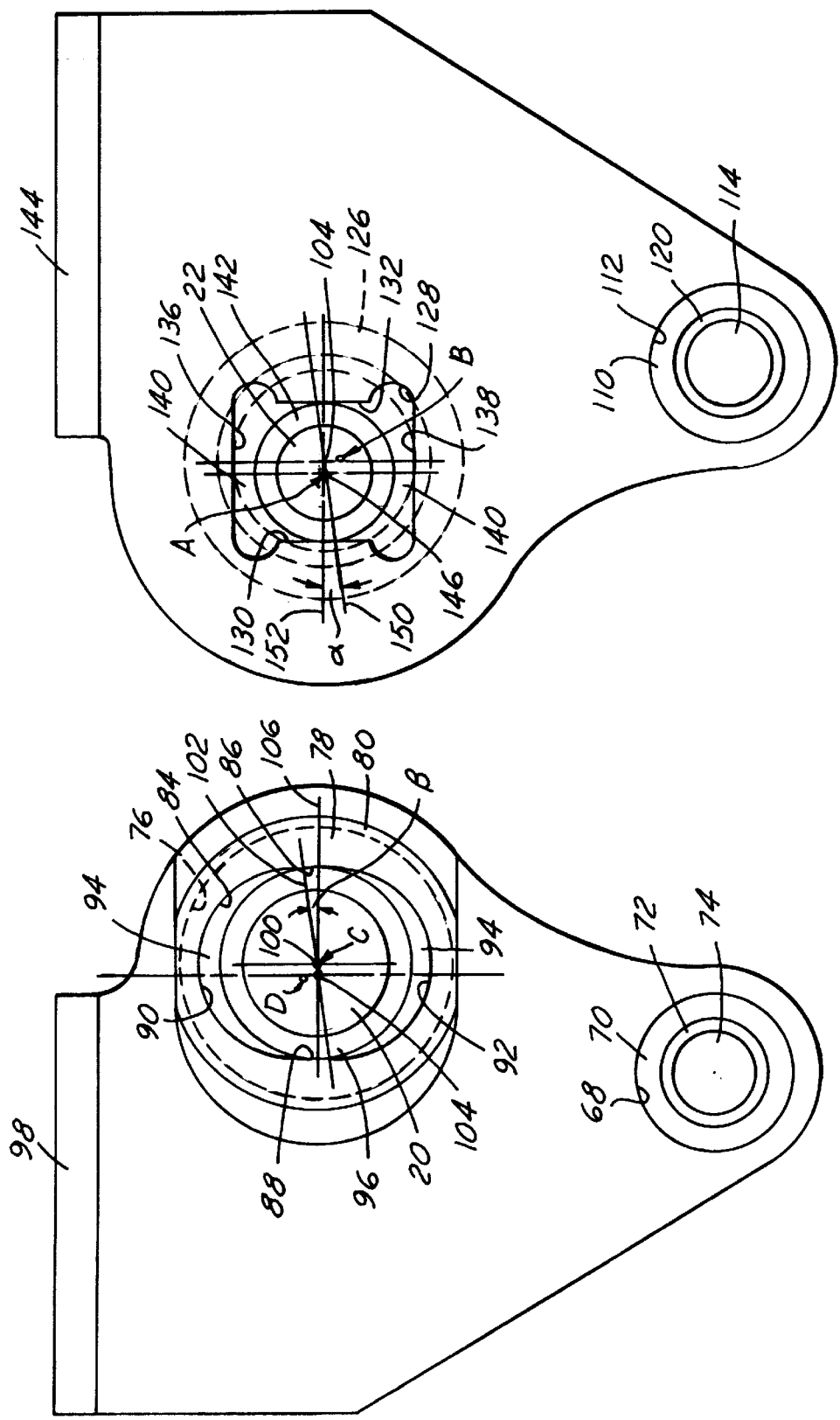

PNEUMATIC CLAMP

FIELD OF THE INVENTION

This invention relates generally to a pneumatic clamp and more particularly to a pneumatic clamp having a large mechanical advantage to provide a significant clamping force.

BACKGROUND OF THE INVENTION

Hydraulic clamps have been used for many years in applications where extremely high clamping forces are required. The fabrication of a frame rail of steel sheet metal for an automotive vehicle, such as a truck, is one such application. A frame rail of a truck typically comprises two generally opposed U-shaped stamped steel members lapped and then welded together to define a hollow, generally rectangular frame rail. After the two U-shaped members have been overlapped, the sides of the outer member must be pressed into contact with the sides of the inner member so that the welding operation can take place. The frame rail members may be several feet long and a single clamp is preferably used to apply a large force to the outer member at several spots along the length of the member. As a result, the clamp must be able to develop an extremely large force, typically at least sixty to eighty thousand pounds, in order to satisfactorily clamp and press the sides of the frame rail members together.

To provide such a large clamping force, hydraulic clamps have been used for this purpose. While capable of generating this extremely large clamping force, hydraulic clamps are undesirable because they are prone to leaking, becoming fouled with contaminants, and have hoses, pumps and other mechanisms which are subject to failure in use thereby increasing the down time of the hydraulic clamp. Further, hydraulic clamps are expensive and difficult to maintain.

SUMMARY OF THE INVENTION

A pneumatic clamp driven by a supply of compressed air at a relatively low pressure has a drive arm connected to a crankshaft on which crankpins or journals are eccentrically mounted to drive clamp arms and produce an extremely large clamping force. The drive arm is connected at one end to an actuating rod of a pneumatic cylinder and is attached at its other end to the crankshaft to rotate the crankshaft as the actuating rod is reciprocated by the cylinder. The drive arm thus provides a mechanical advantage proportional to the distance between its connections to the actuating rod and the axis of the crankshaft to increase the clamping force of the pneumatic clamp. The eccentrically located crankpins also provide a mechanical advantage proportional to the amount by which they are offset from the axis of the crankshaft. The crankpins provide a still further mechanical advantage due to the positioning of their maximum throw relative to the fully closed position of the clamp arms such that the crankpins rotate through a quadrant providing a reduced displacement of the clamp arms per unit of crankshaft rotation when the clamp nears its fully closed position to thereby provide a greatly increased clamping force adjacent to and at the fully closed position of the clamp.

Preferably, two pairs of opposed clamp arms are provided with a pair of outer clamp arms driven in opposition to a pair of inner clamp arms as the crankshaft is rotated. A separate mounting plate is preferably attached to both clamp arms of each pair with each mounting plate carrying a clamping tool which engages and transmits the clamping force to an object received between the tools.

Preferably, the clamp arms of each pair are pivotally mounted adjacent one end on a common axis parallel to the axis of the crankshaft which is received between the arms with a separate crankpin actuating each arm. Preferably, each crankpin engages a follower on its associated arm located between its pivot and associated mounting plate. Desirably, a replaceable wear bushing or bearing is received on each crankpin to increase the in service useful life of the crankshaft and clamp arms.

Objects, features and advantages of this invention include providing a pneumatic clamp which provides a large mechanical advantage to provide an extremely large clamping force from a relatively low pressure compressed air supply, can replace costly and difficult to maintain hydraulic clamps in many applications, can be driven by a typical compressed air supply commonly available in manufacturing facilities, is reliable, durable, of relatively simple design and economical manufacture and assembly and in service, has a long useful life.

BRIEF DESCRIPTION OF THE DRAWINGS

These and other objects, features and advantages of this invention will be apparent from the following detailed description of the preferred embodiment and best mode, appended claims and accompanying drawings in which:

FIG. 4 is a side view of an inner clamp arm;

FIG. 5 is a side view of an outer clamp arm; and

DETAILED DESCRIPTION OF THE PREFERRED EMBODIMENT

Figure 1:
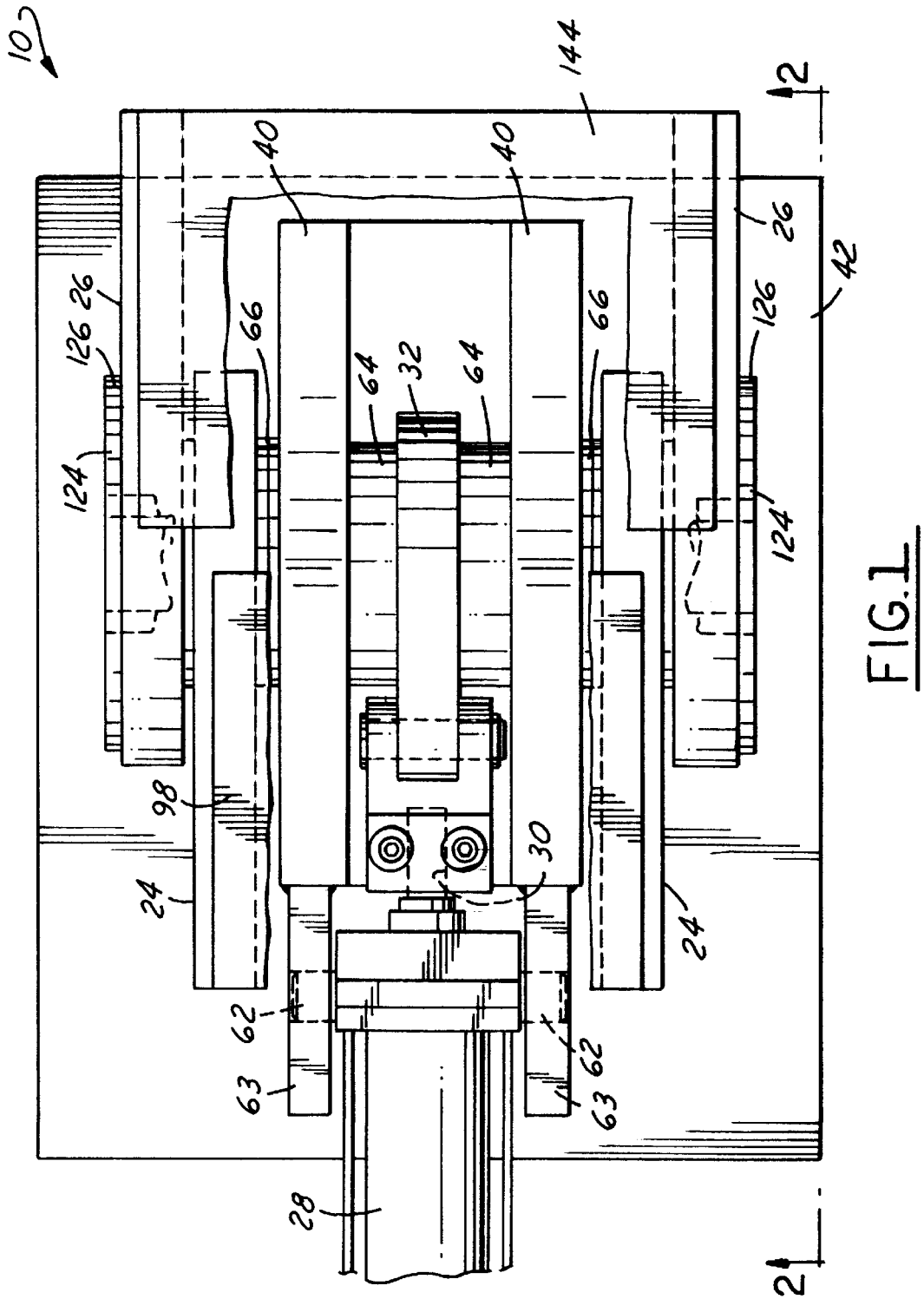
FIG. 1 is a top view of a pneumatic clamp embodying the present invention with portions broken away.
Figure 2:
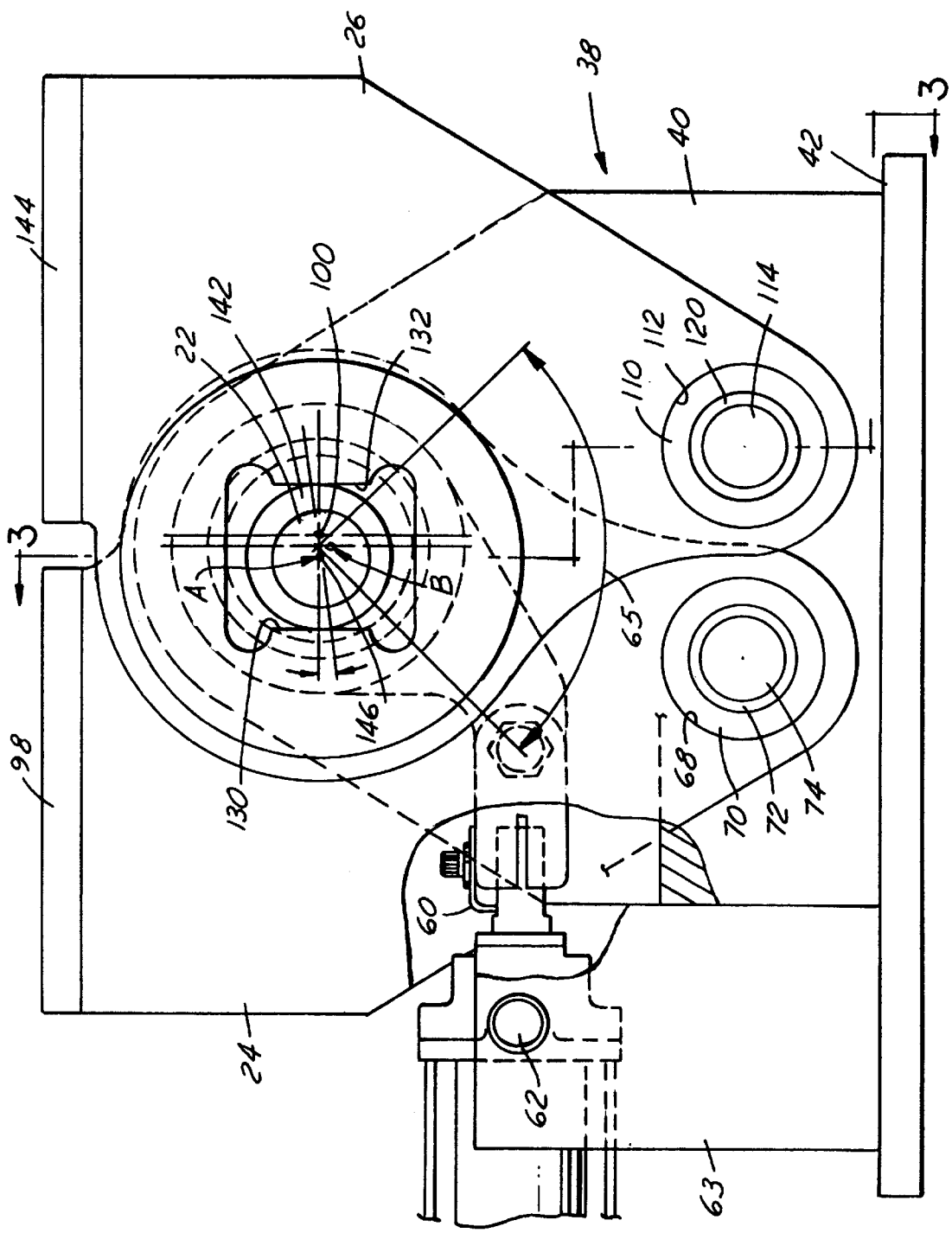
FIG. 2 is an side view of the pneumatic clamp of FIG. 1.
Figure 3:
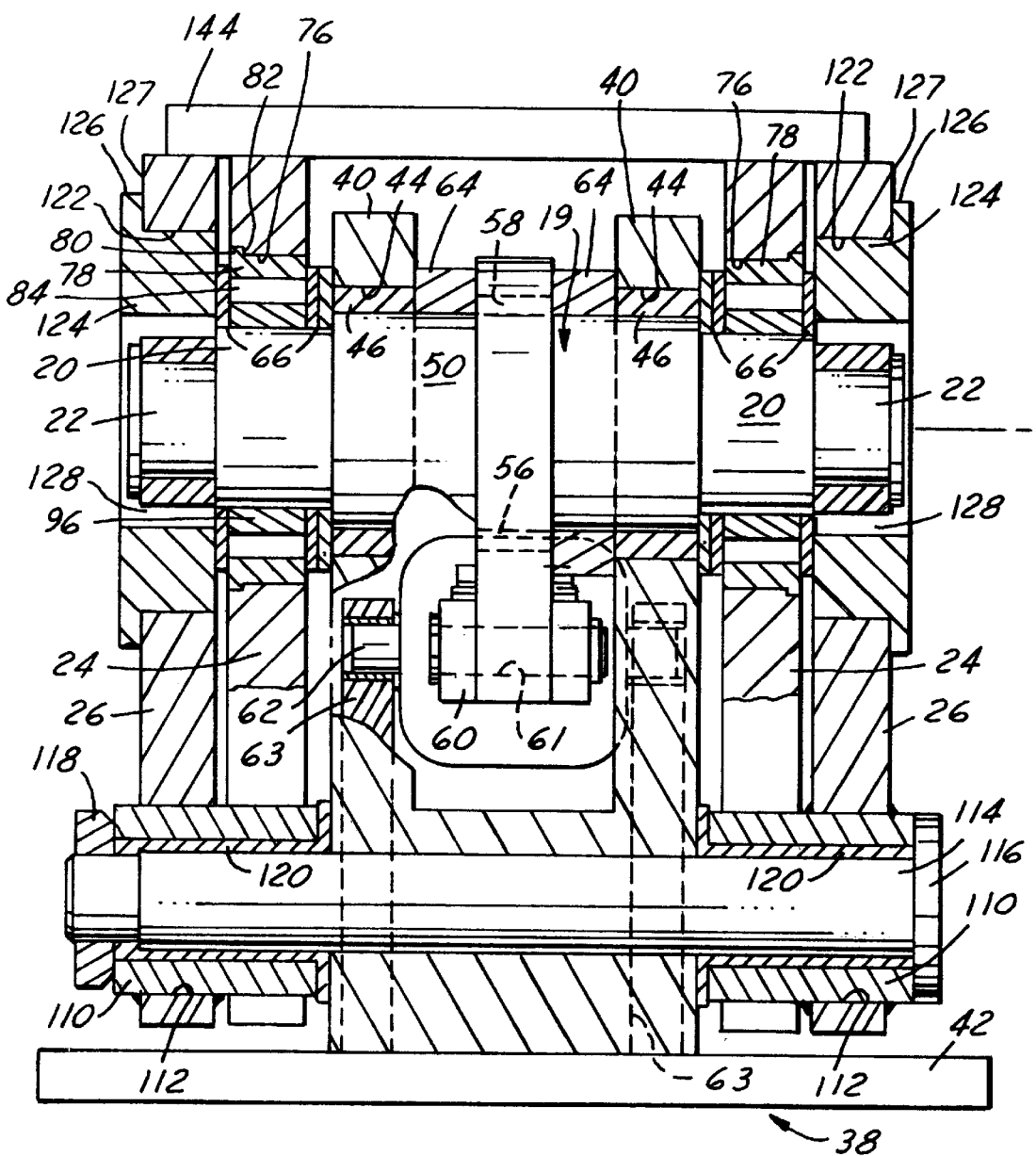
FIG. 3 is a sectional view taken along line 3—3 of FIG. 2.
Figure 6:
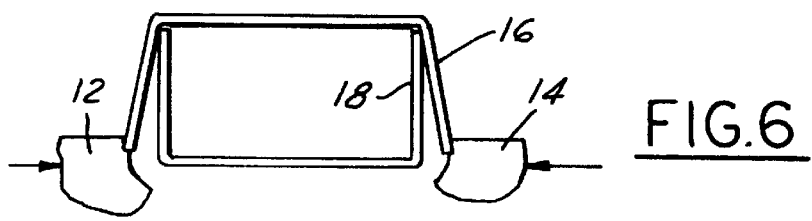
FIG. 6 is a diagrammatic end view of a pair of clamping tools engaging opposed sides of an outer frame rail member to displace and clamp the sides against adjacent sides of an inner frame rail member during fabrication of the frame rail.

Referring in more detail to the drawings, FIGS. 1–3 illustrate a pneumatic clamp 10 embodying this invention for moving, as shown in FIG. 6, a pair of generally opposed tools 12 and 14 between open and closed positions to apply when closing a clamping force to opposed sides of an outer sheet metal member 16 of a vehicle frame rail to force them into engagement with the opposed sides of an inner sheet metal member 18 of the frame rail so that the overlapped sides of the members may be welded together along the free edges of the sides of the outer member. These tools 12 and 14 are mounted on respective pairs of generally opposed inner and outer clamp arms 24 and 26 pivotally mounted on a frame and moved between retracted and advanced positions corresponding to the open and closed positions of the tools. The arms are actuated by a crankshaft 19 having a first pair of crankpins 20 associated with the inner arms 24 and a second pair of crankpins 22 associated with the outer arms 26. The crankshaft is driven by a pneumatic cylinder 28 and actuating rod 30 pivotally connected to one end of a drive arm 32 attached to the crankshaft 19 for rotation in unison therewith.

As shown in FIGS. 1–3, the crankshaft 19 is in one piece with a generally stepped configuration and has a central cylindrical journal 50 with a pair of smaller diameter, cylindrical crankpins 20 adjacent the ends of the journal and smaller diameter, cylindrical crankpins 22 adjacent the ends of the crankshaft. The crankshaft 19 is mounted on a frame 38 which has two spaced apart upright plates 40 attached to a base plate 42. The crankshaft extends through bores 44 and is journalled for rotation by sleeve bearings 46 received within the bores 44 and receiving the crankshaft journal 50. The axis of rotation of the crankshaft 19 is preferably parallel to, spaced from and disposed between the axes of a pair of spaced apart shafts 114, 74 on which the outer clamp arms 26 and inner clamp arms 24, respectively, are pivotally mounted to the frame 38.

To ensure the drive arm 32 rotates in unison with the crankshaft, it has a splined bore 56 received on a complementary splined portion 58 of the crankshaft central journal 50. In assembly, the drive arm 32 is axially retained in engagement with the splined portion by a pair of spacer rings 64 received on the crankshaft journal 50 between the drive arm 32 and the upright 40. The other end of the drive arm 32 is pivotally connected to the actuator rod 30 of the cylinder 28 by a clevis 60 and pin received in a bore 61 through the drive arm 32. The pneumatic cylinder 28 is pivotally mounted on the frame by a pair of trunnions 62 fixed to the body of the cylinder and journalled in complementary bores in a pair of spaced apart plates 63 attached to the base 42 of the frame 38.

The device 60 connecting the actuating rod 30 to the drive arm 32 and the ability of the pneumatic cylinder 28 to pivot about the trunnions 62 permit the drive arm 32 to move along an arcuate path 65 (FIG. 2) when driven by the actuating rod 30. The path 65 of travel of the drive arm 32 spans less than 180°, desirably between about 60° and 150°, and preferably spans between 80° and 100°. The crankshaft 19 is driven for rotation by the drive arm 32 through the same angle spanned by the drive arm 32, preferably between 80° and 100°, as the pneumatic clamp 10 is moved between its open and closed positions.

As best shown in FIGS. 1 and 3, a pair of preferably symmetrical inner clamp arms 24 are provided generally equally spaced from the drive arm 32 and each received between an upright 40 and an outer clamp arm 26. Bushings and/or spacers 66 may be disposed between the inner clamp arms 24 and both the uprights 40 and outer clamp arms 26 to locate the inner clamp arms 24 and to prevent wear of the inner and outer clamp arms 24, 26 as they are driven by the crankshaft 19.

To pivotally mount the inner clamp arms 24 to the frame 38, the inner clamp arms 24 have a through bore 68 with an annular sleeve 70 fixed therein, such as by welding, with an annular bearing 72 received in the sleeve 70 to journal the inner clamp arms for rotation about a shaft 74 which extends through the uprights 40 of the frame 38. The shaft 74 is retained by an enlarged head (not shown) at one end and a nut (not shown) threaded on its other end.

The inner clamp arms 24 also have a second through bore 76 in which a follower or carrier sleeve 78 is received. To locate the follower or carrier sleeve 78 relative to its inner clamp arm 24, each carrier sleeve 78 has a radially outwardly extending flange 80 constructed to engage a circumferentially continuous shoulder 82 of its inner clamp arm 24. Each carrier sleeve 78 has a generally oblong cavity 84 formed therethrough having opposed, planer side walls 86, 88. Generally opposed semicircular wall portions 90, 92 extend from the planer side walls 86, 88 and define clearance gaps 94 permitting relative sliding movement between the inner clamp arms 24 and the first crankpins 20. The planer and parallel side walls 86, 88 of the carrier sleeve cavity 84 are directly engaged by bushings 96 received on the first crankpins 20. In use of the clamp, when worn, the bushings 96 and carrier sleeves 78 may be readily replaced. The inner clamp arms 24 are driven in unison and have a mounting plate 98 which connects them together and provides a mount for the clamping tool 14.

Each of the inner clamp arms 24 is driven by an associated one of the first crankpins 20 which are preferably cylindrical, and as shown in FIG. 4, have an axis 100 which is eccentric to, or radially offset from, and parallel to the axis of rotation 104 of the crankshaft 19.

As the crankshaft 19 is rotated by the drive arm 32, the first crankpins 20 are rotated within their cavities and relative to the inner clamp arms 24 causing the bushings 96 to bear on the side walls 86, 88 of the carrier sleeves 78 to rotate or pivot the inner clamp arms 24 between their advanced and retracted positions corresponding to the closed and open positions of the clamp 10. More specifically, as shown in FIG. 4, when the clamp is in its closed position the axis 100 of each first crankpin 20 is generally at position C. When the crankshaft 19 is rotated to open the clamp, the axis 100 is rotated to position D. This causes the bushing 96 to bear on wall 88 and rotate its inner clamp arm 24 counterclockwise (as viewed in FIGS. 2 and 4) to its retracted position to open the clamp. Conversely, to move the inner clamp arms 24 towards their advanced positions, to close the clamp 10, the crankshaft 19 is rotated to move the axis 100 of each first crankpin 20 from position D to position C such that the bushings 96 increasingly engage the side wall 86 of the cavity 78 and cause the inner clamp arms 24 to rotate clockwise (as viewed in FIG. 2) about their pivot shaft 74. Advantageously, as the axis 100 of each crankpin 20 nears position C, the magnitude of the corresponding displacement of the inner clamp arms 24 diminishes per unit of rotation of the crankshaft 19. In other words, the cosine of an acute included angle β (FIG. 4), which is defined by a line 102 intersecting the crankshaft axis of rotation 104 and the axis 100 of crankpin 20 and a line 106 perpendicular to wall 86 and extending through the crankshaft axis 104, nears 1.0 as the clamp nears its fully closed position. This provides a mechanical advantage which greatly increases the clamping force of the pneumatic clamp 10 when it is close to and in its fully closed position.

The maximum throw of the first crankpins 20, and hence, the maximum displacement of the inner clamp arms 24 would occur when the axis 100 of each crankpin intersects the line 106 perpendicular to the side wall 86. The rotation of the crankpins 20 past this line 106 would result in a decreased clamping force. Thus, the axis 100 of the crankpins 20 preferably do not reach the line 106 perpendicular to the side wall 86 of the carrier sleeves 78, and are offset by an angle β (FIG. 4) between the lines 102 and 106 which is desirably less than 15°, usually between 6° and 10°, and preferably about 8°. By preventing the angle β from becoming zero degrees, a consistent maximum clamping force can be provided by the pneumatic clamp 10.

The outer clamp arms 26 are preferably symmetrical and generally evenly spaced from a midpoint of the crankshaft 19. To pivotally mount the outer clamp arms 26 to the frame 38, each outer clamp arm 26 has an annular sleeve 110 fixed, such as by welding, in a through bore 112. A shaft 114 extends through the sleeve 110 of each outer clamp arm 26 and a bore of each upright 40 and is retained therein by an enlarged head 116 at one end and a nut 118 threaded on its other end. The outer clamp arms are journalled for rotation about the shaft 114 by annular bearings 120 received over the shaft 114 and in the sleeves 110.

Each outer clamp arm 26 also has a second bore 122 formed therethrough and in which a carrier sleeve 124 is received. To locate the carrier sleeves 124 relative to their associated outer clamp arms 26, each carrier sleeve 124 has a radially outwardly extending flange 126 constructed to engage an outer surface 127 of its outer clamp arm 26 in assembly. As best shown in FIG. 5, the carrier sleeves 124 have a cavity 128 formed therein and defined at least in part by a pair of spaced apart, planar and parallel side walls 130, 132 and generally opposed upper and lower walls 136,138, respectively. To permit relative sliding movement of the outer clamp arms 26 and the second crankpins 22, gaps 140 are provided between an annular wear bushing 142 received on each of the second crankpins 22 and the upper and lower walls 136, 138 of the cavity 128. To prevent wear of the outer clamp arms 26 in use, the carrier sleeves 124 are directly engaged by the bushings 142 surrounding the second crankpins 22. Desirably, the bushings 142 and/or the carrier sleeves 124 can be readily replaced when they become worn in use.

Apart from the flat side walls 130, 132 of the cavity 128 which are engaged by the bushings 142 upon rotation of the crankshaft 19, the specific shape of the cavity 128 is not important. The specific configuration of the cavity 128 shown in FIG. 5 is preferred for ease of forming, and may be formed by a conventional end mill tool.

The outer clamp arms 26 are driven in unison and have a mounting plate 144 which connects them together and provides a surface to which a clamping tool 12 (FIG. 6) can be mounted. Each of the outer clamp arms 26 is driven by an associated one of the second crankpins 22 which are preferably cylindrical, and as shown in FIG. 5, have an axis 146 which is eccentric to, or radially offset from, and parallel to the axis of rotation 104 of the crankshaft 19. The outer clamp arms 26 are driven by the engagement of the bushings 142 of the second crankpins 22 with the carrier sleeves 124 as the crankshaft 19 is rotated to move the clamp 10 between its open and closed positions.

As best shown in FIG. 5, when the clamp 10 is in its closed position, the axis 146 of each crankpin 22 is at position A and when the clamp 10 is open, the axis 146 of each crankpin 22 is generally at position B. So that the outer clamp arms 26 are driven in a direction of rotation or pivotal movement opposite that of the inner clamp arms 24 and at the same rate, the second crankpins 22 and their bushings 142 are positioned, relative to the axis 104 of the crankshaft 19 with their axes 146 generally diametrically opposed to the axes 100 of the first crankpins 20 and offset by a distance equal to that of the axes 100 of the first crankpins 20.

Desirably, when the clamp 10 is in its closed position, the axis 146 of each crankpin 22 is at position A which is angularly offset by an acute included angle α (FIG. 5), which is equal to β, and is defined between a line 150 intersecting the crankpin axis 146 and the crankshaft axis 104 and a line 152 perpendicular to wall 130 and intersecting the crankshaft axis 104. As the axis 146 of each crankpin 22 nears position A, the cosine of angle α nears 1.0. Thus, the corresponding displacement of the outer clamp arms 26 diminishes per unit of rotation of the crankshaft 19 creating a mechanical advantage which significantly increases the clamping force of the pneumatic clamp 10 adjacent to and at its closed position.

To move the outer clamp arms 26 to their retracted positions, corresponding to the open position of the clamp 10, the crankshaft 19 is rotated counterclockwise (as viewed in FIGS. 2 and 5) and the bushing 142 applies a force to the other wall 132 of the cavity 128 causing the outer clamp arm 26 to rotate or pivot clockwise about its shaft 114.

Thus, with a single actuator, such as a pneumatic cylinder 28, or ball screw driven by a stepper motor, the crankshaft 19 is rotated through a predetermined quadrant to thereby cause an associated simultaneous movement of the inner clamp arms 24 and the outer clamp arms 26 in opposed directions, to open and close the clamp 10. The mechanical advantage obtained by the length of the drive arm 32, the offset axes of the crankpins 20, 22 and their bushings 96, 142 relative to the axis 104 of the crankshaft 19, the specific quadrant or path of movement of the crankpins 20,22 and bushings 96, 142 relative to the follower walls 130, 86 which they engage to close the clamp and the distance between the application of the force to the clamp arms and their pivot shafts 114, 74 all provide a significant mechanical advantage to the pneumatic clamp 10. Desirably, an extremely large clamping force, on the order on 80,000 pounds or more, may be generated from a pneumatic cylinder producing a force of about 1,000 pounds and actuated by a supply of compressed air at a relatively low pressure of 80 to 100 psi. Thus, this pneumatic clamp 10 may be used in place of hydraulic clamps which are expensive, difficult to maintain, prone to leaking, becoming foul with contaminants, and have hoses, pumps and other components subject to failure in use.

Those skilled in the art will appreciate that various modifications may be made without departing from the scope and spirit of the appended claims. For instance, a camshaft may be used instead of the crankshaft with a separate cam used to actuate each clamp arm.

What is claimed is:

1. A pneumatic clamp, comprising:
   a frame;
   a crankshaft carried by the frame for rotation about an axis;
   a drive arm connected to the crankshaft for rotation in unison with the crankshaft;
   a first crankpin and a second crankpin each eccentrically mounted on the crankshaft for co-rotation with the crankshaft;
   a first clamp arm pivotally carried by the frame and having a cavity constructed to receive the first crankpin such that upon rotation of the crankshaft the first crankpin pivotally moves the first clamp arm;
   a second clamp arm pivotally carried by the frame and having a cavity constructed to receive the second crankpin such that upon rotation of the crankshaft the second crankpin pivotally moves the second clamp arm whereby, upon rotation of the crankshaft in one direction by the actuator to move the clamp to its closed position, the first crankpin moves the first clamp arm in a first direction of rotation and the second crankpin simultaneously moves the second clamp arm in a direction of rotation opposite said first direction of rotation to thereby move the first and second clamp arms towards each other to apply a clamping force to an object and upon rotation of the crankshaft in a direction opposite said one direction, the first and second crankpins cause rotation of their respective clamp arms in opposed directions to move the first and second clamp arms away from each other to move the clamp to its open position.

2. The clamp of claim 1 which also comprises a pair of bushings, each bushing surrounding a separate one of the first and second crankpins and constructed to bear on an associated clamp arm.

3. The clamp of claim 1 wherein the first crankpin and second crankpin are each circular in cross-section and have an axis offset from the axis of rotation of the crankshaft.

4. The clamp of claim 1 wherein the crankshaft is rotated between 60 and 180 degrees between the open and closed positions of the clamp.

5. The clamp of claim 4 wherein the crankshaft is rotated about 80 to 100 degrees between the open and closed positions of the clamp.

6. The clamp of claim 1 wherein the connection between the drive arm and the actuator is spaced from the connection between the drive arm and the crankshaft to increase the torque transmitted to the crankshaft and thereby increase the clamping force of the clamp.

7. The clamp of claim 1 wherein the cavity in the first clamp arm and the cavity in the second clamp arm have opposed flat walls therein constructed to be engaged by a crankpin when the crankshaft is rotated to cause movement of the clamp arms.

8. The clamp of claim 1 wherein the cavity in the first clamp arm and the cavity in the second clamp arm have a follower therein having a pair of spaced apart flat walls constructed to be engaged by a crankpin when the crankshaft is rotated to cause movement of the clamp arms.

9. The clamp of claim 8 wherein each of the first and second crankpins is circular and have an axis offset from the axis of rotation of the crankshaft and the first and second crankpins are positioned relative to their associated clamp arms so that for each crankpin a line intersecting the axis of the crankpin and the axis of rotation of the crankshaft is inclined to a line extending through the axis of the crankshaft and perpendicular to the flat wall of the follower of its associated clamp arm engaged by the crankpin when the clamp is moved to its closed position at an acute included angle of between 5 and 20 degrees.

10. The clamp of claim 9 wherein said acute included angle is in the range of 6 to 10 degrees.

11. The clamp of claim 9 wherein the line intersecting the axis of the crankpin and the axis of rotation of the crankshaft is rotated towards but not through said line intersecting the axis of rotation of the crankshaft and perpendicular to the flat wall of the cavity engaged by the crankpin as the clamp is moved towards its closed position.

12. The clamp of claim 1 which also comprises:
   a third crankpin and a fourth crankpin each eccentrically mounted on the crankshaft for co-rotation with the crankshaft;
   a third clamp arm pivotally carried by the frame and having a cavity constructed to receive the third crankpin such that upon rotation of the crankshaft the third crankpin pivotally moves the third clamp arm;
   a fourth clamp arm pivotally carried by the frame and having a cavity constructed to receive the fourth crankpin such that upon rotation of the crankshaft the fourth crankpin pivotally moves the fourth clamp arm.

13. The clamp of claim 12 which also comprises a first mounting plate connecting together the first and third clamp arms, a second mounting plate connecting together the second and fourth clamp arms and a pair of clamping tools each disposed on a separate one of the first and second mounting plates and having a clamping surface adapted to engage an object disposed between the clamping tools when the clamp is in its closed position.

14. The clamp of claim 12 wherein the first and third clamp arms are generally equally axially spaced from a midpoint of the crankshaft and said second and fourth clamp arms are also generally equally axially spaced from a midpoint of the crankshaft with the first and third clamp arms received between the second and fourth clamp arms.

15. The clamp of claim 14 wherein the drive arm is connected to the crankshaft generally at the midpoint of the crankshaft.

16. The clamp of claim 1 wherein the first clamp arm pivots about an axis spaced from and parallel to the axis of rotation of the crankshaft and the second clamp arm pivots about an axis spaced from and parallel to both the axis about which the first clamp arm pivots and the axis of rotation of the crankshaft, and the axis of rotation of the crankshaft lies between the axes about which the first and second clamp arms pivot.

17. The clamp of claim 3 wherein the axes of the first and second crankpins are parallel to the axis of rotation of the crankshaft.

18. The clamp of claim 12 wherein the first and third clamp arms pivot about a first axis which is spaced from and parallel to the axis of rotation of the crankshaft, the second and fourth clamp arms pivot about a second axis spaced from and parallel to both the first axis and the axis of rotation of the crankshaft, and the axis of rotation of the crankshaft lies between the first axis and second axis.

19. A pneumatic clamp, comprising:
   a frame;
   a crankshaft carried by the frame for rotation about an axis;
   a drive arm connected to the crankshaft for rotation in unison with the crankshaft;
   a pair of first crankpins and a pair of second crankpins each eccentrically mounted on the crankshaft for co-rotation with the crankshaft;
   a pair of first clamp arms each pivotally carried by the frame and having a follower constructed to receive a first crankpin such that upon rotation of the crankshaft the first crankpins pivotally move the first clamp arms;
   a pair of second clamp arms each pivotally carried by the frame and having a follower constructed to receive a second crankpin such that upon rotation of the crankshaft the second crankpins pivotally move the second clamp arms whereby, upon rotation of the crankshaft in one direction by the actuator to move the clamp to its closed position, the first crankpins move the first clamp arms in a first direction of rotation and the second crankpins simultaneously move the second clamp arms in a direction of rotation opposite said first direction of rotation to thereby move the pairs of first and second clamp arms toward each other to apply a clamping force to an object and upon rotation of the crankshaft in a direction opposite said one direction, the first and second crankpins cause rotation of their respective clamp arms in opposed directions to move the pairs of first and second clamp arms away from each other to move the clamp to its open position.

20. The clamp of claim 19 wherein each first crankpin and each second crankpin is circular in cross-section and has an axis offset from the axis of rotation of the crankshaft.

21. The clamp of claim 19 which also comprises a first mounting plate connecting together the first clamp arms, a second mounting plate connecting together the second clamp arms and a pair of clamping tools each disposed on a separate one of the first and second mounting plates and having a clamping surface adapted to engage an object disposed between the clamping tools when the clamp is in its closed position.

22. The clamp of claim 19 wherein the first clamp arms are generally equally axially spaced from a midpoint of the crankshaft and the second clamp arms are also generally equally axially spaced from a midpoint of the crankshaft with the first clamp arms received between the second clamp arms.

23. The clamp of claim 22 wherein the drive arm is connected to the crankshaft generally at the midpoint of the crankshaft.

24. The clamp of claim 19 wherein the first clamp arms pivot about a first axis which is spaced from and parallel to the axis of rotation of the crankshaft, the second clamp arms pivot about a second axis spaced from and parallel to both the first axis and the axis of rotation of the crankshaft, and the axis of rotation of the crankshaft lies between the first axis and second axis.

* * * * *